Figure 1:
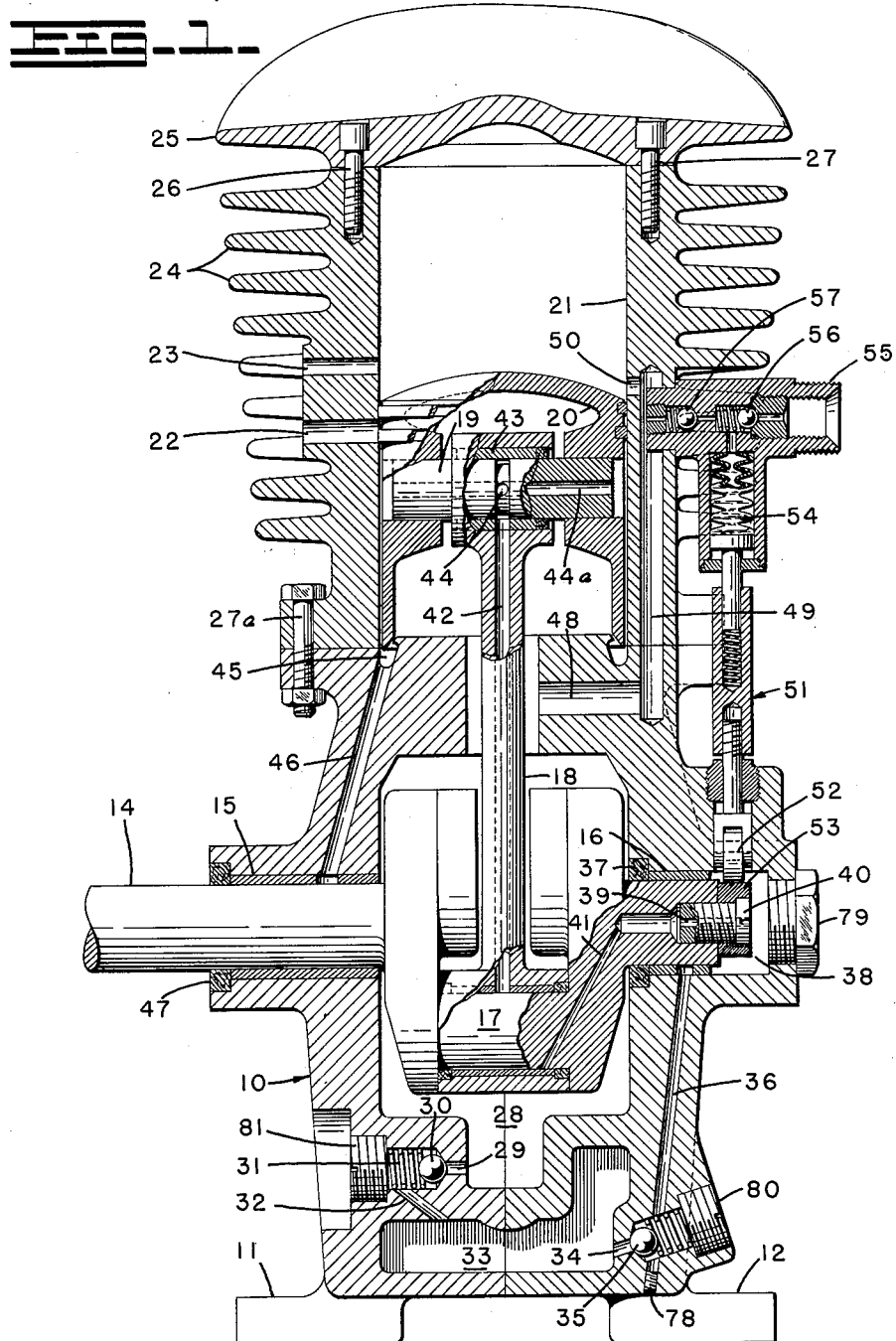

May 9, 1961  W. P. DALRYMPLE  2,983,334
2-CYCLE ENGINE
Filed Nov. 18, 1957  3 Sheets-Sheet 1

INVENTOR
WILLIAM P. DALRYMPLE
BY
ATTORNEY

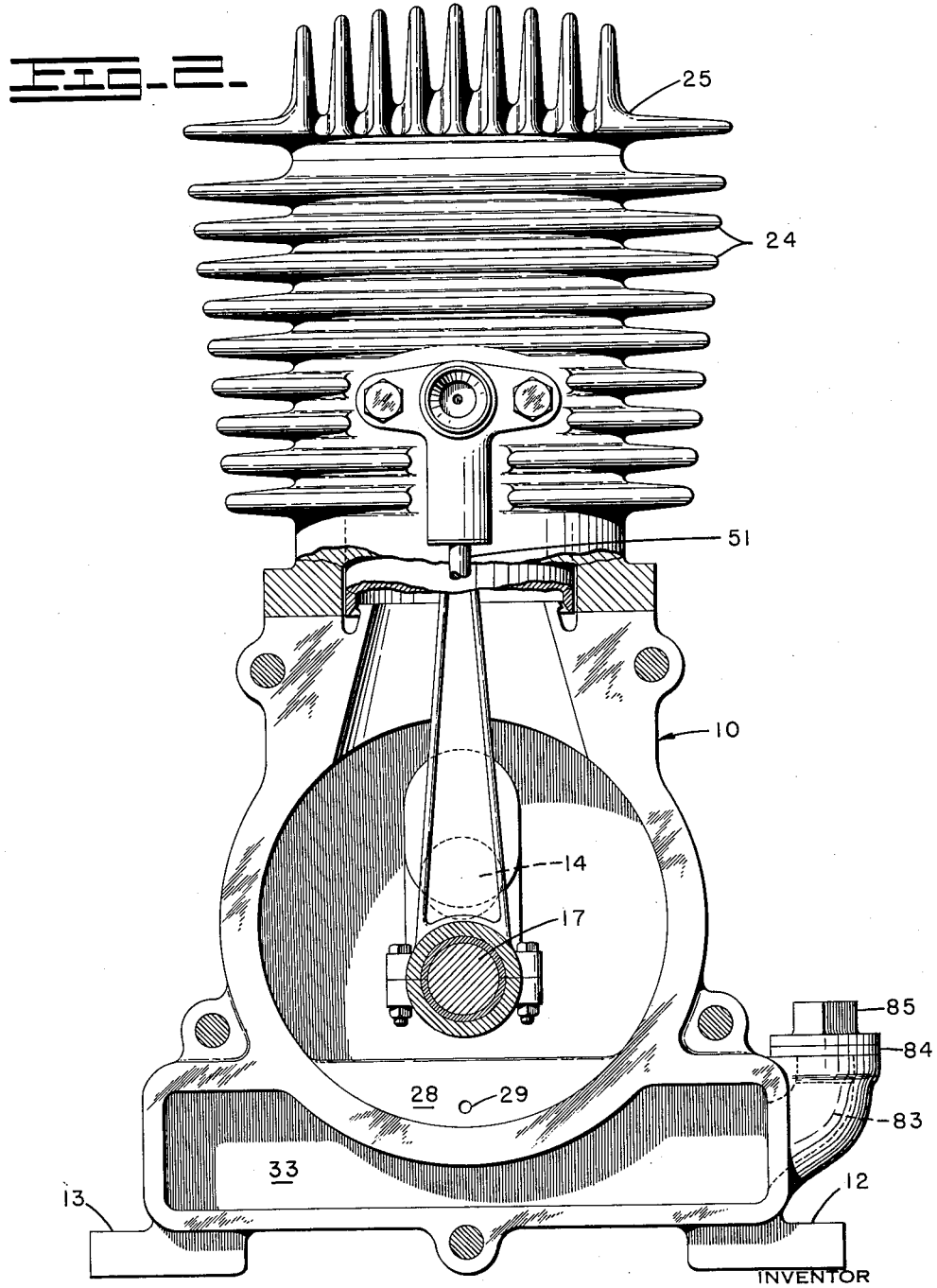

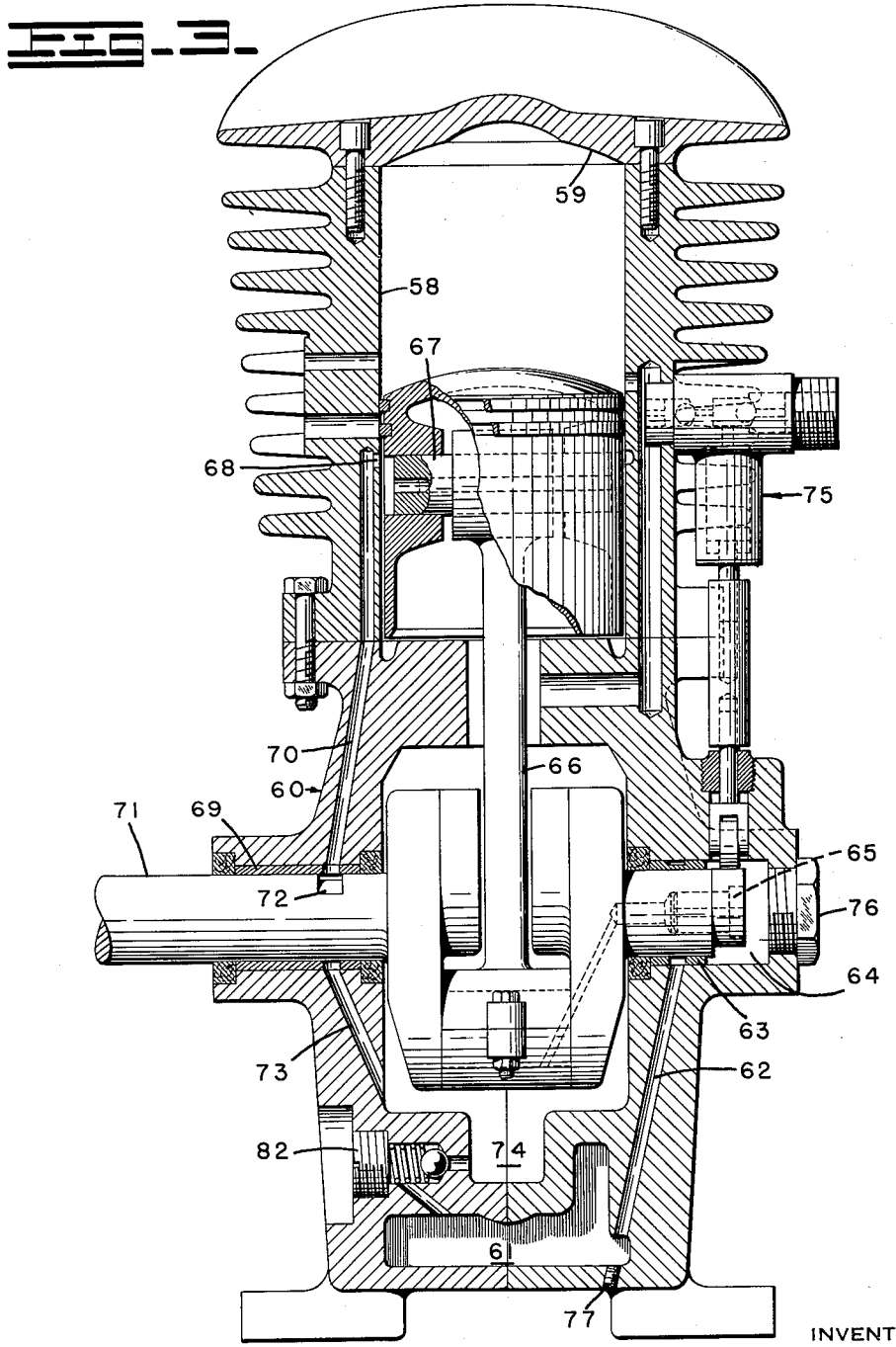

2,983,334

2-CYCLE ENGINE

William P. Dalrymple, 2019 Wealthy St. SE.,
Grand Rapids, Mich.

Filed Nov. 18, 1957, Ser. No. 697,123

7 Claims. (Cl. 184—6)

This invention relates to the construction of reciprocating-piston engines of the type having a pulsating pressure within the crankcase. Many compressors, as well as the 2-cycle internal combustion engine, fall within this general category. Lubrication of these engines has always been a problem because of the fact that the intake flow of gases from the crankcase into the cylinder renders it impractical to utilize the crankcase as a storage for large quantities of lubricant. In the 2-cycle gasoline engine, for example, any attempt to use a splash lubricating system or any lubricating system that allows oil to be thrown in suspension and allowed to flow to the combustion chamber from the crankcase would result in such complete contamination of the intake flow as to make the engine inoperable.

The pulsations in crankcase pressure in the 2-cycle gasoline engine result from the movement of the piston. An intake port communicating with the interior of the crankcase is normally covered by the piston or by a valve mechanism during the majority of the upward movement of the piston. This action creates a partial vacuum within the crankcase; and when the intake port is uncovered by the piston near the extremity of its upward stroke, the air rushes in in response to the pressure differential. On the downstroke of the piston, the port is again covered. Continued movement of the piston compresses the contents of the crankcase until the piston approaches the extremity of its movement and uncovers the intake port into the cylinder. A conduit leading from the crankcase to the cylinder intake provides a path for the movement of the compressed gases. In the 2-cycle internal combustion engine, fuel is mixed with the air either at the point of admission into the crankcase or at some point in the conduit leading from the crankcase to the cylinder, or the fuel may be injected directly into the cylinder.

The pulsating pressures within the crankcase resulting from the cycle of operation previously outlined present a source of energy which is available for inducing the movement of lubricant. Pressure lubricating systems involving special pumps have been used in 2-cycle engines, but the cost of the installation is considerable. This invention provides the functioning of a pressure-lubricating system without involving a separate pumping arrangement, and a means of lubricating the moving parts with oil confined to conduits in a way that the oil is maintained out of suspension and separate from the fuel and gases entering the combustion chamber. A collecting basin is provided in the crankcase for receiving lubricant which drains out of the crankshaft bearings, and a passage leads from this basin into a pressure chamber. A valve system within this conduit restricts the flow to a movement exclusively toward the pressure chamber, resulting in an intermittent movement of a small quantity of lubricant each instance of a pressure phase of the cycle within the crankcase. The pressure effective on the lubricant within the pressure chamber therefore remains as a source of energy for inducing the flow of lubricant to the various elements of the machine where wear occurs. The pressure in the reservoir chamber could be as low and a margin lower than atmospheric pressure, and in this circumstance oil would still be caused to flow from the reservoir through the bearings and conduits and around the piston to the crank chamber. In the preferred form of the invention, the path of lubricant flow includes not only the crankshaft bearings, but also the connecting rod journal, the piston pin, and the cylinder walls. Suitable valve means are also provided within this conduit for preventing back flow toward the pressure chamber in response to the pulsating pressures in the crankcase.

The particular type of valving utilized to control the flow of lubricant may be selected from several possibilities. One-way ball valves are entirely suitable, and a rotary valve system formed integrally with the crankshaft will also serve the purpose. The several features of this invention will be analyzed in further detail through a discussion of the particular embodiments illustrated in the accompanying drawings.

In the drawings:

Figure 1 presents a sectional elevation on a plane containing the axis of the crankshaft, and showing a 2-cycle gasoline engine with the piston at the extremity of the downstroke.

Figure 2 presents a fragmentary sectional elevation on a plane perpendicular to the axis of the crankshaft of the engine shown in Figure 1.

Figure 3 presents a modified form of the invention installed in an engine of the general type shown in Figures 1 and 2. Figure 3 is a fragmentary section on a plane containing the axis of the crankshaft.

The air-cooled engine shown in Figures 1 and 2 includes the crankcase 10 provided with mounting feet 11, 12, 13, and a fourth one which does not appear on the drawings. The crankshaft 14 is carried by the bearings 15 and 16 supported by the crankcase 10, and the crank 14 has a conventional "throw" providing the journal 17 for the connecting rod 18. At the upper extremity of the connecting rod, a pin 19 establishes a connection to the piston 20 sliding within the walls of the cylinder 21. An air intake port 22 is covered by the piston 20 during a majority of its stroke, but is uncovered for a short moment at the upper extremity of its movement. An exhaust port 23 permits the escape of the products of combustion. The exterior of the cylinder 21 is formed in the series of fins 24 for the transfer of heat to the surrounding air. Normally the cylinder unit includes a separable head portion 25 secured to the cylinder by bolts as shown at 26 and 27, the head unit usually including a mounting for a spark plug which is not shown on these drawings. The cylinder unit itself is secured to the crankcase by a series of bolts as indicated at 27a.

In the modification shown in Figures 1 and 2, it is preferable that the crankcase be formed to provide a collecting basin 28 at the lowermost portion of the crankcase for receiving accumulations of lubricant. With the piston in the position illustrated in Figure 1, there will normally be a pressure within the crankcase which is considerably above atmospheric. Such pressure will result in movement of the lubricant collected within the basin 28 through the aperture 29 and around the ball valve 30. The action of the spring 31 is insufficient to oppose this pressure, and lubricant passing through the aperture 29 eventually moves out through the passage 32 into the pressure chamber 33. The pressure built up within the chamber 33 by the continued sequence of these pulses is sufficient to move the lubricant within the pressure chamber out through the opening 34 past the ball valve 35, and to the bearing 16 through the passage 36. The presence of a seal 37 causes the lubricant to move to the right as shown in Figure 1 from the bearing and to accumulate within the space 38 until the level of the axial hole 39 in the screw 40 is reached. A conduit is provided within the crank itself for the movement of lubricant to the journal 17, and this passage includes the diagonal hole 41 drilled within the material of the crank "throw." The presence of seals at the opposite ends of the journal 17 causes lubricant to move from that point through the hole 42 in the connecting rod 18 to lubricate the connection between the upper end of the connecting rod and the piston pin 19. Seals at the opposite end of the bearing 43 cause the lubricant to move through the opening 44 into the axial opening 44a in the piston pin, and from there to the walls of the cylinder 21.

Lubricant moving downwardly over the walls of the cylinder under the action of the higher pressures above the piston and the reciprocating movement of the piston accumulates in the annular trough 45 which drains to the bearing 15 through the passage 46 in the crankcase structure. The presence of the seal 47 at the outer extremity of the bearing 15 causes the lubricant to be discharged inwardly from the bearing into the crankcase, and the lubricant then finds its way down into the collecting basin 28. During the portions of the cycle in which the piston is moving upwardly, the action of the ball valves 30 and 35 prevents the dissipation of pressure within the chamber 33. The ball valve 35 also prevents any tendency for the lubricant to flow backwardly through the passage 36 in response to pressure which might conceivably leak into the system at the bearings. During the portion of the cycle in which the piston position creates a pressure in the crankcase which is less than that in the reservoir, that pressure differential is effective to induce movement of the lubricant.

The pulsating pressures which are thus utilized in inducing a movement of the lubricant to the various working surfaces of the machine are a by-product of the cycle which causes a flow of intake air to take place through the passages 48 and 49 as soon as the air-fuel supply port 50 is uncovered by the piston at the extremity of its downstroke. In the illustrated example, fuel is supplied to the intake air just prior to the opening of the port 50 by the injection system involving the plunger assembly 51 including the cam follower 52 driven by the cam 53 secured to the end of the crank 14 by the screw 40. The reciprocating movement of the plunger assembly 51 causes a corresponding pulsating variation in the length of the bellows unit 54 creating a pumping action on the fuel entering through the pipe connection 55. On the extension of the bellows, the ball valve unit 56 permits an inflow of fuel, and on compression of the bellows 54 the fuel is forced past the ball valve unit 57 into the passage 49 where it is intermixed with the intake air.

Referring to Figure 3, a modified form of the invention is illustrated which differs from the arrangement shown in Figures 1 and 2 in the manner in which the lubricant is collected from the cylinder walls and returned to the crankcase, and also in the type of valving utilized to control the direction of the flow of lubricant. The cylinder unit 58, the head 59, and the crankcase 60 have the same general exterior configuration as the corresponding parts in the modification shown in Figures 1 and 2. The pressure chamber 61 is also similar, but the outlet conduit 62 is not provided with a valve as in the case of the arrangement previously discussed. Lubricant moves to the bearing unit 63 and into the chamber 64 in the same manner, and from the chamber 64 follows the same passage through the plug 65, through a diagonal hole in the crank throw, upwardly through the connecting rod 66 to the piston pin 67, through which the lubricant moves outwardly to the walls of the cylinder 58.

Lubricant moving downwardly along the walls of the cylinder 58 tends to accumulate in the annular groove 68, from which it drains to the bearing 69 through the passage 70. A portion of the crankshaft 71 is machined off as shown at 72 to serve as a rotary valve which permits a passage of a small quantity of liquid during a portion of each rotation of the crankshaft. The principal purpose of the valve 72 is to prevent pressure coming through the passage 73 which would tend to oppose the flow of lubricant along the path previously described. The valve 72 can be regarded either as a valve which connects the conduit 70 with the passage 73, or as a collector for a small quantity of lubricant which is carried around the bearing from the conduit 70 and dumped into the passage 73. Lubricant moving downwardly through the passage 73 is discharged into the interior of the crankcase, and collects in the basin 74.

The injection system generally indicated at 75 is similar to that shown in Figure 1, and the remainder of the machine is also equivalent to that previously described in greater detail. The plugs 76, 77, 78, and 79 are conventional in the art of machine construction, and are used to close off openings required for access. The plugs 80, 81, and 82 serve as a base for the action of the respective springs with which they are associated.

It is preferable that the oil fill point be selected as shown on Figure 2. The passage 83 extends laterally from the pressure chamber 33, and is sealed by the washer 84 and the removable screw-plug 85. In the event that the seal is not complete as a result of improper installation, the pulsating system will still be partially effective to move the oil. That part of the pressure cycle in the chamber which is below atmospheric will still be present in such a case, as a result of positioning the fill opening in the pressure chamber.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. In a 2-cycle internal combustion engine having a crankcase provided with first and second crankshaft bearing means, a crankshaft having a connecting rod journal, a connecting rod engaging said journal, a piston, a piston pin engaging said connecting rod and said piston, a cylinder, and air-fuel supply port means having open and closed conditions, said closed condition preventing outflow from said crankcase during the major portion of the cycle of said engine wherein the pressure in said crankcase exceeds the pressure supplied to said air-fuel supply port means, all secured in operating relationship, a lubricating system comprising: means forming a lubricant-collecting basin in the normally lowermost portion of said crankcase; means forming a pressure chamber normally fixed with respect to said crankcase and disposed below said basin; first conduit means, said first conduit means communicating between said basin and said pressure chamber; first one-way valve means, said first one-way valve means restricting flow in said first conduit means to one direction corresponding to flow toward said pressure chamber; second conduit means, said second conduit means communicating between said pressure chamber and said first bearing means; second one-way valve means, said second one-way valve means restricting flow in said second conduit means to one direction corresponding to flow from said pressure chamber; third conduit means, said third conduit means extending from said first bearing means through a portion of said crank to said connecting rod journal, from said journal to said piston pin and to the wall of said cylinder; annular collector groove means communicating with the wall of said cylinder to receive lubricant moving downwardly over the wall of said cylinder; and fourth conduit means, said fourth conduit means communicating between said collector groove means and said second bearing means.

2. In a 2-cycle internal combustion engine having a crankcase provided with first and second crankshaft bearing means, a crankshaft having a connecting rod journal, a connecting rod engaging said journal, a piston, a piston pin engaging said connecting rod and said piston, a cylinder, and air-fuel supply port means having open and closed conditions, said closed condition preventing outflow from said crankcase during the major portion of the cycle of said engine wherein the pressure in said crankcase exceeds the pressure supplied to said air-fuel supply port means, all secured in operating relationship, a lubricating system comprising: means forming a lubricant-collecting basin in the normally lowermost portion of said crankcase; means forming a pressure chamber normally fixed with respect to said crankcase and disposed below said basin; first conduit means, said first conduit means communicating between said basin and said pressure chamber; first one-way valve means, said first one-way valve means restricting flow in said first conduit means to one direction corresponding to flow toward said pressure chamber; second conduit means, said second conduit means communicating between said pressure chamber and said first bearing means; second one-way valve means, said second one-way valve means restricting flow in said second conduit means to one direction corresponding to flow from said pressure chamber; third conduit means, said third conduit means extending from said first bearing means through a portion of said crank to said connecting rod journal, from said journal to said piston pin and to the wall of said cylinder; annular upwardly-open collector trough means disposed adjacent the lower extremity of said cylinder to receive lubricant moving downwardly over the wall of said cylinder; and fourth conduit means, said fourth conduit means communicating between said collector trough means and said second bearing means.

3. In a reciprocating piston engine having a crankcase provided with first and second crankshaft bearing means, a crankshaft having a connecting rod journal, a connecting rod engaging said journal, a piston, a piston pin engaging said connecting rod and said piston, a cylinder, and air-fuel supply port means having open and closed conditions, said closed condition preventing outflow from said crankcase during the major portion of the cycle of said engine wherein the pressure in said crankcase exceeds the pressure supplied to said air-fuel supply port means, all secured in operating relationship, a lubricating system comprising: means forming a lubricant-collecting basin in the normally lowermost portion of said crankcase; means forming a pressure chamber normally fixed with respect to said crankcase; first conduit means, said first conduit means communicating between said basin and said pressure chamber; first one-way valve means, said first one-way valve means restricting flow in said first conduit means to one direction corresponding to flow toward said pressure chamber; second conduit means, said second conduit means communicating between said pressure chamber and said first bearing means; second one-way valve means, said second one-way valve means restricting flow in said second conduit means to one direction corresponding to flow from said pressure chamber; third conduit means, said third conduit means extending from said first bearing means through a portion of said crank to said connecting rod journal, from said journal to said piston pin and to the wall of said cylinder; annular collector groove means associated with said cylinder to receive lubricant moving downwardly over the wall of said cylinder; and fourth conduit means, said fourth conduit means communicating between said collector groove means and said second bearing means.

4. In a reciprocating piston engine having a crankcase provided with first and second crankshaft bearing means, a crankshaft having a connecting rod journal, a connecting rod engaging said journal, a piston, a piston pin engaging said connecting rod and said piston, a cylinder, and air-fuel supply port means having open and closed conditions, said closed condition preventing outflow from said crankcase during the major portion of the cycle of said engine wherein the pressure in said crankcase exceeds the pressure supplied to said air-fuel supply port means, all secured in operating relationship, a lubricating system comprising: means forming a lubricant-collecting basin in the normally lowermost portion of said crankcase; means forming a pressure chamber normally fixed with respect to said crankcase; first conduit means, said first conduit means communicating between said basin and said pressure chamber; first one-way valve means, said first one-way valve means restricting flow in said first conduit means to one direction corresponding to flow toward said pressure chamber; second conduit means, said second conduit means communicating between said pressure chamber and said first bearing means; second one-way valve means, said second one-way valve means restricting flow in said second conduit means to one direction corresponding to flow from said pressure chamber; third conduit means, said third conduit means extending from said first bearing means through a portion of said crank to said connecting rod journal, from said journal to said piston pin and to the wall of said cylinder; upwardly-open collector trough means disposed adjacent the lower extremity of said cylinder to receive lubricant moving downwardly over the wall of said cylinder; and fourth conduit means, said fourth conduit means communicating between said collector trough means and said second bearing means.

5. In a reciprocating piston engine having a crankcase provided with first and second crankshaft bearing means, a crankshaft having a connecting rod journal, a connecting rod engaging said journal, a piston, a piston pin engaging said connecting rod and said piston, a cylinder, and air-fuel supply port means having open ond closed conditions, said closed condition preventing outflow from said crankcase during the major portion of the cycle of said engine wherein the pressure in said crankcase exceeds the pressure supplied to said air-fuel supply port means, all secured in operating relationship, a lubricating system comprising: means forming a lubricant-collecting basin in the normally lowermost portion of said crankcase; means forming a pressure chamber normally fixed with respect to said crankcase; first conduit means, said first conduit means communicating between said basin and said pressure chamber; first one-way valve means, said first one-way valve means restricting flow in said first conduit means to one direction corresponding to flow toward said pressure chamber; second conduit means, said second conduit means communicating between said pressure chamber and said first bearing means; second one-way valve means, said second one-way valve means restricting flow in said second conduit means to one direction corresponding to flow from said pressure chamber; third conduit means, said third conduit means extending from said first bearing means through a portion of said crank to said connecting rod journal, from said journal to said piston pin and to the wall of said cylinder; collector means disposed to receive lubricant moving downwardly over the wall of said cylinder; and fourth conduit means, said fourth conduit means communicating between said collector means and said second bearing means.

6. In a reciprocating piston engine having a crankcase, crankshaft bearing means, a crankshaft provided with a connecting rod journal, a connecting rod engaging said journal, a piston, a piston pin engaging said piston rod and said piston, a cylinder, and air-fuel supply port means having open and closed conditions, said closed condition preventing outflow from said crankcase through said air-fuel supply port means during the major portion of the cycle of said engine wherein the pressure in said crankcase exceeds the pressure supplied to said air-fuel supply port means, a lubricating system comprising: means forming a pressure chamber below said crankcase; conduit means communicating between said crankcase, pressure chamber, bearing means, and cylinder wall, and conduit means interconnecting said cylinder wall, bearing means and said crankcase, traversing portions of said crankshaft, connecting rod, and piston pin; and valve means including a rotary valve integral with said crankshaft, said valve means being operatively associated with said engine and said first mentioned conduit means to provide for flow from said cylinder wall and prevent backflow toward said cylinder wall by synchronization of valve position with pressure conditions within said crankcase in predetermined phase relationship.

7. In a reciprocating engine having a crankcase, air intake means traversing said crankcase, a crankshaft bearing means, a crankshaft provided with a connecting rod journal, a connecting rod engaging said journal, a cylinder, a piston disposed in said cylinder, and a piston pin engaging said connecting rod and said piston, a lubricating system comprising: conduit means traversing selected members of said engine in sequence, and including lubricant-collection means communicating with the wall of said cylinder and a passage leading from said lubricant-collection means to said crankshaft bearing means, said conduit means maintaining substantial isolation of lubricant from said crankcase; said piston serving as pressure-generating means for urging lubricant along said conduit whereby said members are lubricated and said crankcase caused to remain free of substantial accumulation of lubricant, and whereby the exteriors of said crankshaft and connecting rod are kept from contact with lubricant.

References Cited in the file of this patent
UNITED STATES PATENTS

| | | |
|---|---|---|
| 683,886 | Woolf | Oct. 1, 1901 |
| 1,441,329 | Cato | Jan. 9, 1923 |
| 1,731,774 | Gurley | Oct. 15, 1929 |
| 1,898,631 | Irgens | Feb. 21, 1933 |
| 1,998,723 | Irgens | Apr. 23, 1935 |
| 2,513,547 | Buell | July 4, 1950 |